United States Patent [19]

Igel

[11] 3,752,394

[45] Aug. 14, 1973

[54] MODULAR ARITHMETIC AND LOGIC UNIT

[75] Inventor: John Joseph Igel, Rochester, Minn.

[73] Assignee: International Business Machines Corporation, Armonk, N.Y.

[22] Filed: July 31, 1972

[21] Appl. No.: 276,339

[52] U.S. Cl. .................. 235/174, 235/175, 235/176

[51] Int. Cl. .............................................. G06f 7/50

[58] Field of Search ..................... 235/174, 175, 176

[56] References Cited

UNITED STATES PATENTS

| | | | |
|---|---|---|---|
| 3,445,641 | 5/1969 | Rinaldi et al. ...................... | 235/176 |
| 3,596,074 | 7/1971 | Mitrofanoff ......................... | 235/174 |
| 3,711,693 | 1/1973 | Dahl .................................. | 235/174 |

*Primary Examiner*—Malcolm A. Morrison
*Assistant Examiner*—David H. Malzahn
*Attorney*—Donald F. Voss et al.

[57] ABSTRACT

A modular and arithmetic logic unit (ALU) for performing logic functions of AND, OR and exclusive OR and arithmetic functions of binary and decimal subtract/add where decimal subtract/add operates with both zoned decimal and decimal data formats. A pair of registers holds the two operands. The outputs of one register feed complement circuitry and the outputs of the other register together with outputs from the complement circuitry go into a subtractor and into borrow look ahead circuitry. The subtractor feeds the borrow look ahead circuitry and function control logic. The outputs from the borrow look ahead circuitry are sent back into the subtractor and one of the outputs is borrow out. The data outputs are taken from a six correct circuit having inputs from the function control logic. Control signals appropriately control the operation of the complement circuit, subtractor, borrow look ahead circuit, function control logic and the six correct circuit.

17 Claims, 8 Drawing Figures

MODULAR ARITHMETIC AND LOGIC UNIT

BACKGROUND OF THE INVENTION

1. Field of the Invention

This invention relates to modular arithmetic and logic units and more particularly to such units for performing logical functions of AND, OR and exclusive OR and arithmetic functions of binary and decimal subtract/add where decimal subtract/add operates with both zoned decimal and decimal data formats without performing packing and unpacking operations.

2. Description of the Prior Art

Arithmetic and logic units in the prior art have been able to perform either decimal arithmetic or zoned decimal arithmetic but not both. In order to perform zoned decimal arithmetic with an arithmetic and logic unit having capability to do decimal arithmetic, it was necessary to pack the zoned decimal data into decimal form and after the arithmetic was done, to unpack the data and change it to zoned decimal form. Similarly, data in decimal form had to be unpacked for arithmetic and logic units operating with zoned decimal data and after the arithmetic operation it was necessary to change the unpacked data to decimal form.

SUMMARY OF THE INVENTION

The principal objects of this invention are to provide an improved arithmetic and logic unit which: (A) can perform logical functions of AND, OR and exclusive OR and arithmetic functions of binary and decimal subtract/add where decimal subtract/add operates with both zoned decimal and decimal data formats; (B) can provide complements in one's, two's, nine's or 10's form; (C) can be connected in parallel so as to accommodate larger operands; and (D) can be implemented with large scale integration circuitry whereby the additional functions performed by the arithmetic and logic unit are relatively inexpensive.

The objects of the invention are achieved by providing an arithmetic and logic unit which can propagate a borrow in signal through the sign position when performing a decimal operation and for propagating the borrow in signal through the sign for the low order digit and through the zone for succeeding digits when performing a zoned decimal operation.

DETAILED DESCRIPTION

Figure 1:
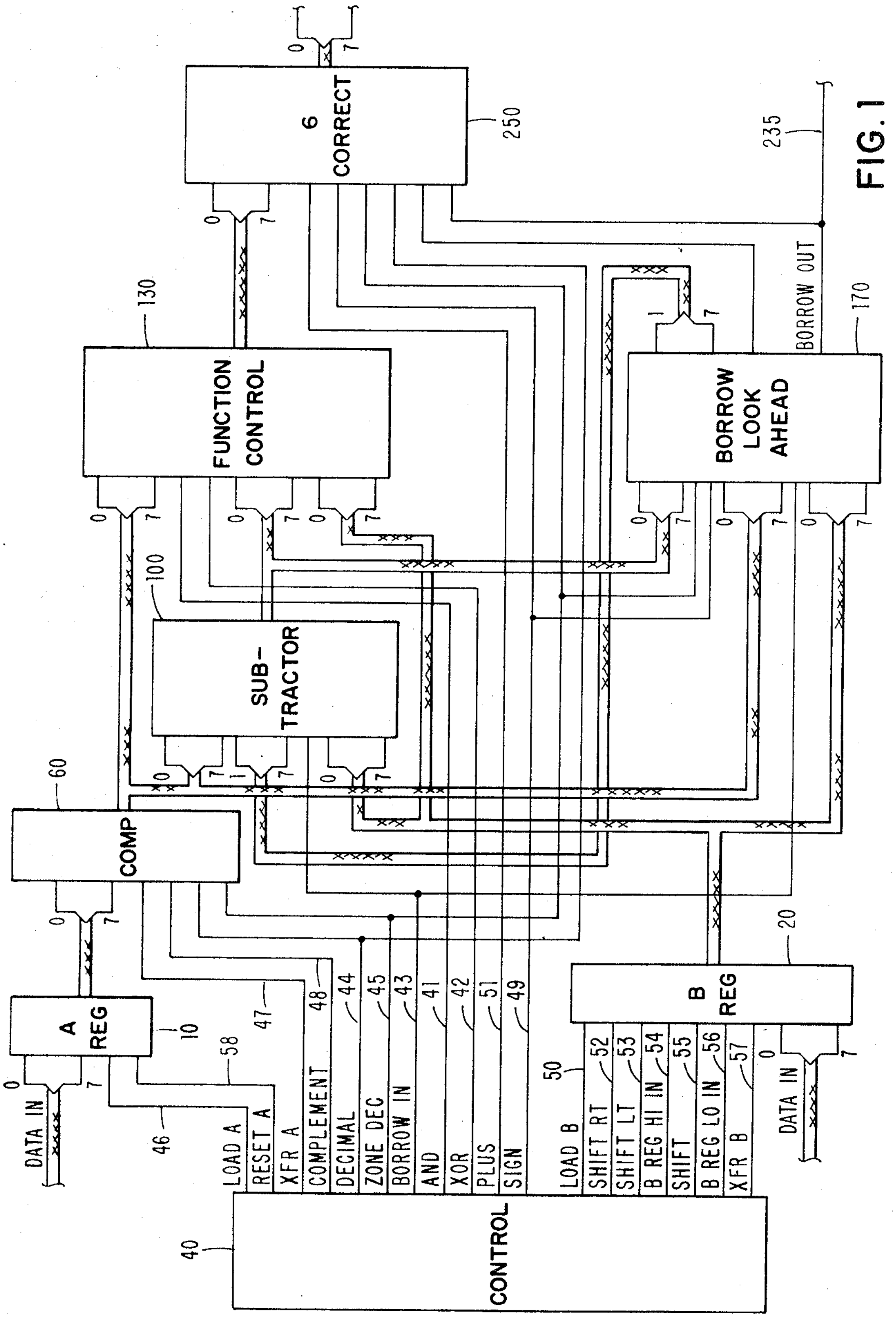
FIG. 1 is a schematic block diagram illustrating the invention.
Figure 2:
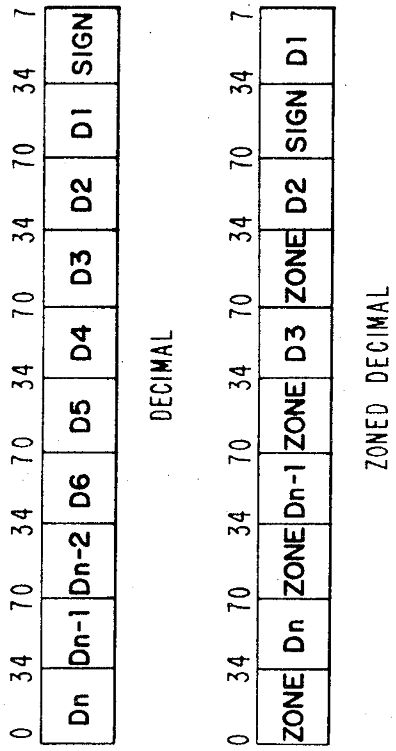
FIG. 2 is a diagram illustrating decimal and zoned decimal data formats.
Figure 3A:
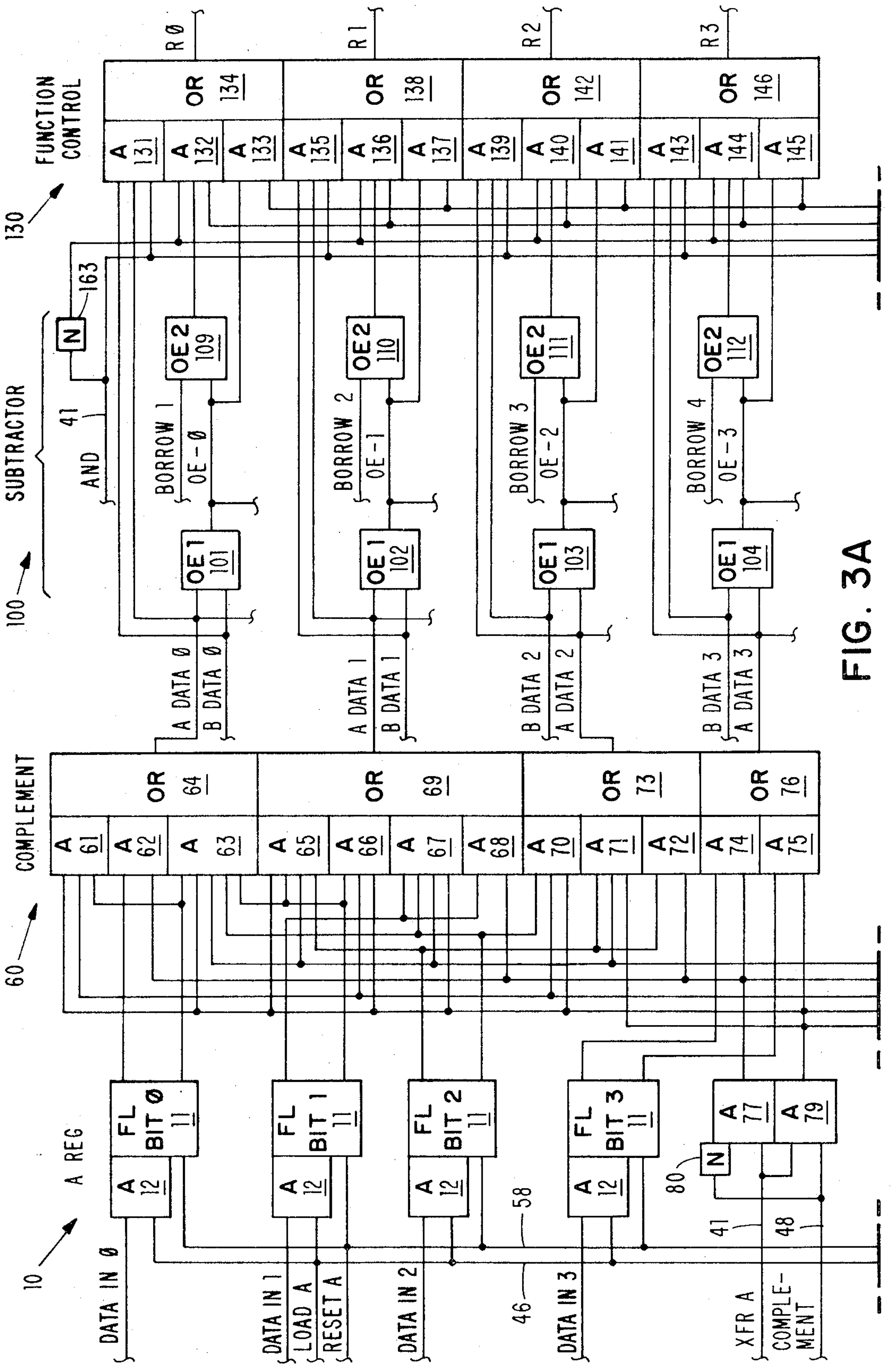
Figure 3B:
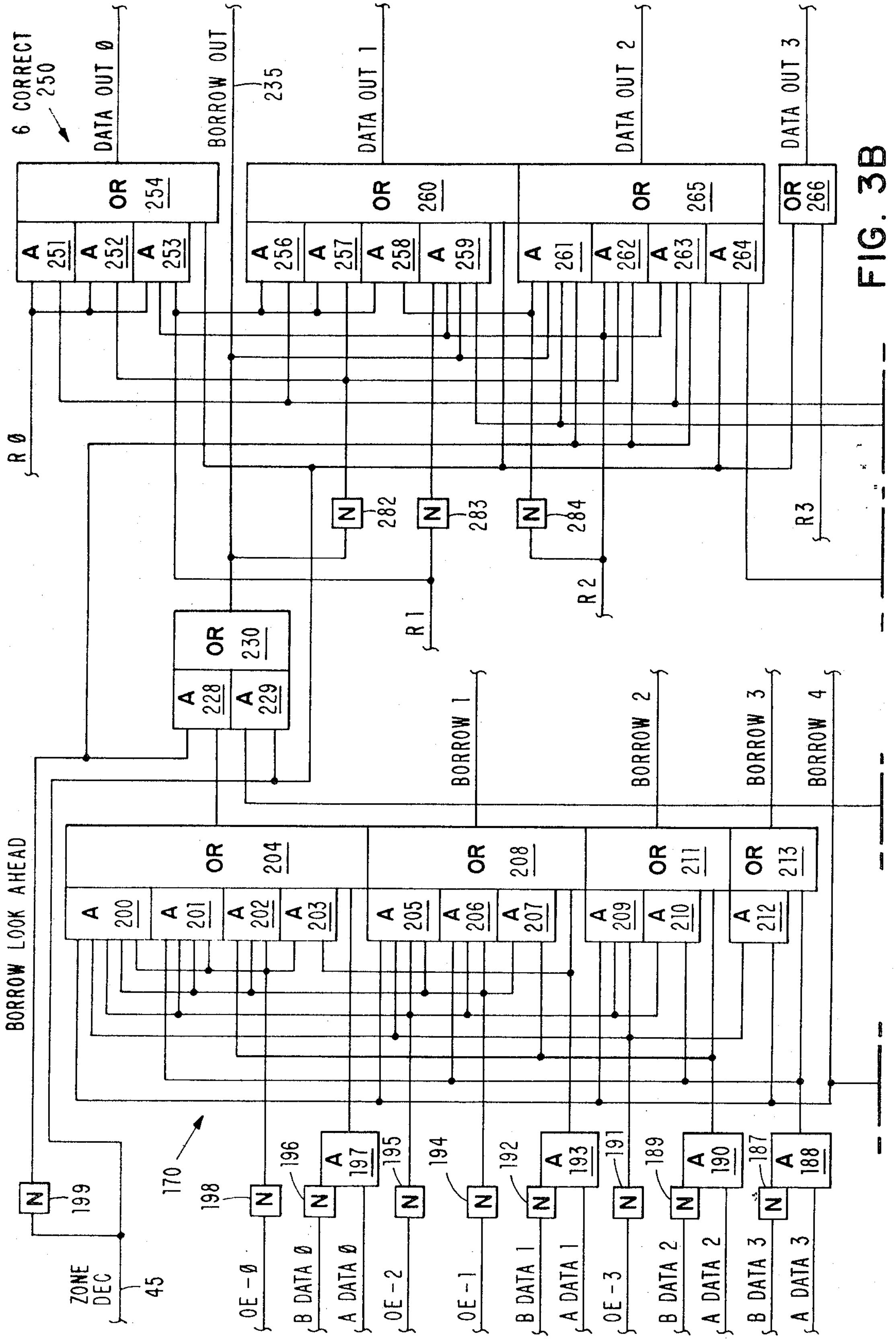
Figure 3C:
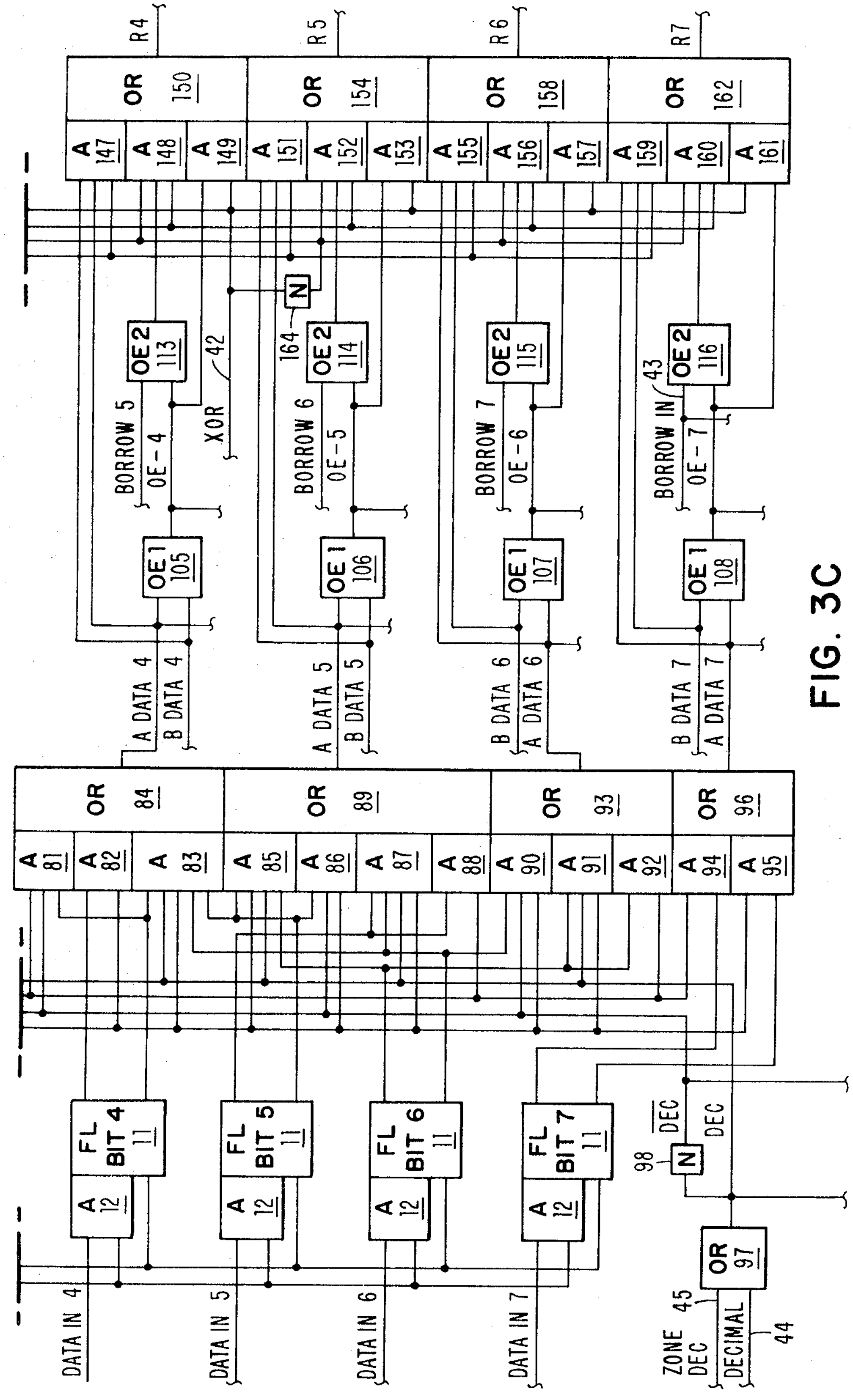
Figure 3D:
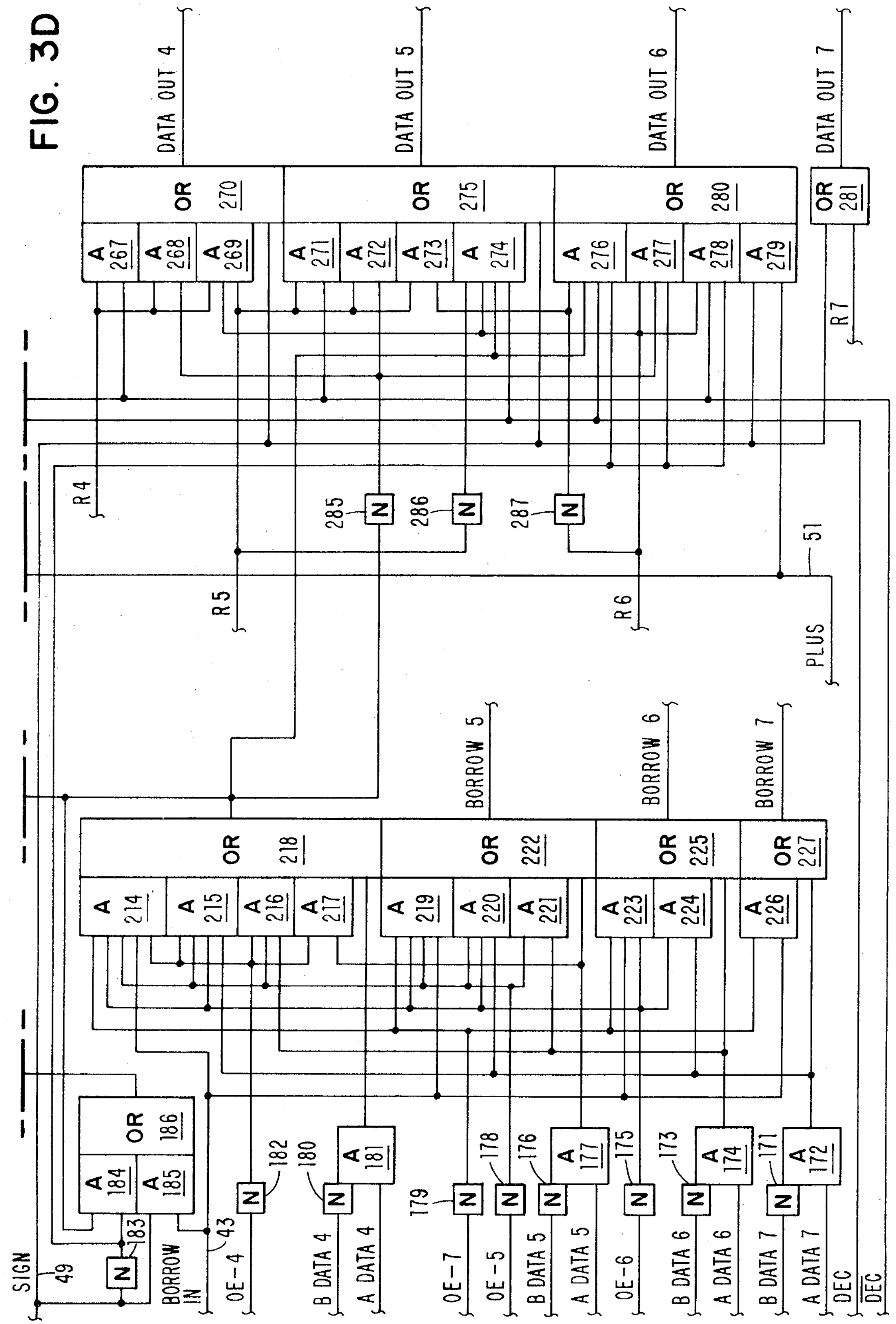
Figure 3E:
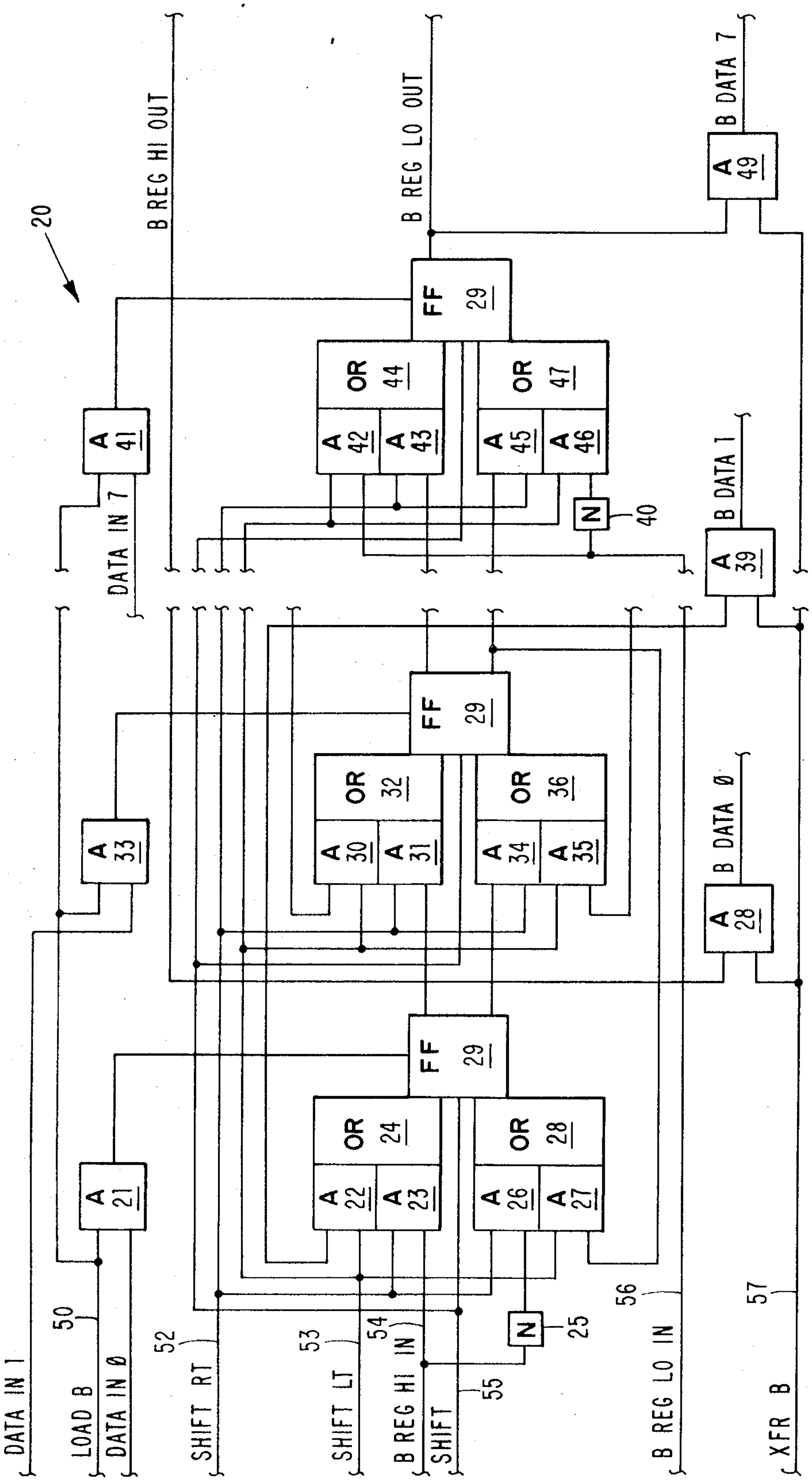

With reference to the drawings and particularly to FIG. 1, the invention is illustrated by way of example as including registers 10 and 20 which are loaded with operands under control of load signals, load A and load B on conductors 46 and 50 respectively from control circuit 40. Registers 10 and 20 each have eight positions for storing binary bits 0–7 inclusive where bit 0 and bit 7 are the high and low order bits respectively. This arrangement accommodates computer systems operating with eight bit bytes. The byte can represent binary data, decimal data, or zoned decimal data. The byte of binary data therefore can represent an operand of two to the eighth power, and of course, bytes can be assembled to represent larger numbers. The low order byte of decimal data uses bits 0–3 to represent a digit in binary form and bits 4–7 to represent the sign of the number in binary form. Higher order bytes of decimal data contain two digits each being represented in binary form with four binary bits. Bits 0–3 of the low order byte of zoned decimal data represents the sign of the number in binary form. The bits 4–7 of the low order of byte of zoned decimal data represent a numeric digit in binary form. Higher order bytes of zoned decimal data contain zone bits for bits 0–3 and a numeric digit for bits 4–7. Zoned decimal and decimal data formats are shown in FIG. 2.

The outputs of register 10 are connected to inputs of complement circuit 60. Complement circuit 60 is controlled by signals from control 40 so that data from register 10 can pass to subtractor 100 in true or complement form. Complement circuit 60 can form the one's, or nine's complement of the data in register 10. The one's complement is used to develop the two's complement in subtractor 100 when performing binary arithmetic and the nine's complement is used to form the 10's complement in the subtractor 100 in in decimal operations. The two's and 10's complements are formed by respectively taking the one's and nine's complements and forcing a borrow into the low order bit position of the byte. The borrow is selectively forced by control 40 which provides a Borrow In signal on control line 43.

Subtractor 100 logically subtracts the operand passed by complement circuit 60 from the operand in register 20. In this example register 10 is the A register and register 20 is the B register. Thus, subtractor 100 performs the function B minus A where A can be in true or complement form. Subtractor 100 also has borrow inputs from borrow look ahead circuit 170.

Borrow look ahead circuit 170 receives inputs from register 20, complement circuit 60 and subtractor 100 and is controlled by signals from control 40. The outputs of the borrow look ahead circuit 170 are fed to subtractor 100 and to six correct circuit 250. The borrow look ahead circuit 170 is used for decimal and zoned decimal operations. When performing decimal arithmetic, it is necessary to propagate the Borrow In signal thorugh the sign position. Control 40 enables control line 43 for gating Borrow In to the high order digit of the low order byte of decimal data. Control 40 also enables control lines 49 and 51 for forcing a plus or minus sign as the low order output bits 4–7 of the six correct circuit 250. This arrangement permits the sign to be ignored originally because it will be automatically produced by the control signals Sign and Plus from control 40. Thus, the sign appears in the low order bits 4–7 of the low order byte and the low order digit of the low order byte is represented by high order bits 0–3. However, the next operation for decimal arithmetic involves two digits contained in the byte rather than a sign and digit. During this operation the Sign control signal from control 40 is not available so that the Borrow In signal is applied to the low order bits 4–7 and the borrow from the low order bits forming the low order digit will be propagated to the high order bits 0–3. Successive higher order bytes are handled in the same manner.

When performing zoned decimal arithmetic, control 40 provides a Zoned Decimal signal on conductor 45 which gates the Borrow from the low order bits 4–7 as the Borrow Out signal. The low order bits 4–7 form the low order digit for the low order byte at the output of the six correct circuit 250 and the high order bits 0–3 represent the sign where the sign bits are forced by the Zoned Decimal and Plus control signals from control 40. The bits representing the sign appear at the output of the six correct circuit 250. The next byte contains a digit as represented by the bits 4–7 and a zoned portion represented by bits 0–3. When operating upon this higher order and succeeding higher order bytes, control 40 enables the borrow from the low order bits 4–7 as a Borrow Out signal and forces zoned bits for the bits 0–3 by means of the Zoned Decimal control signal.

The six correct circuit 250 is constructed so that the output data signals for the arithmetic and logic unit are taken from this circuit. The six correct circuit 250 has inputs from function control circuit 130, control 40, and borrow look ahead circuit 170. The six correct circuit 250 is used for certain decimal operations which will be described later. However, it should be noted that the six correct logic 250 in this particular invention includes logic controlled by signals from control 40 whereby the data outputs for the arithmetic and logic unit are taken from the six correct circuit 250.

The function control circuit 130 includes logic which has inputs from subtractor 100 from the borrow look ahead 170 and is controlled by control signals from control 40. When control 40 provides an AND signal on conductor 41 to function control 130, the operand in register 10 is ANDed with the operand in register 20 and the results appear at the output of the six correct circuit 250. The operand in register 10 passes through complement circuit 60 to function control circuit 130 but normally it is not complemented and control 40 does not provide a complement signal on conductor 48. The Exclusive OR function is performed by function control circuit 130 on the operands in registers 10 and 20 when control 40 furnishes an XOR signal on conductor 42. During this operation, complement circuit 60 does not normally complement the operand from register 10. The results of the Exclusive OR operation appear at the outputs of the six correct circuit 250. The logical OR function is performed by function control circuit 130 when control 40 simultaneously provides AND and XOR signals on conductors 41 and 42 respectively. When the logical OR function is performed, complement circuit 60 does not normally complement the operand from register 10. The results of the logical OR operation appear at the outputs of the six correct circuit 250. Of course, any of teh logical operations, i.e., AND, exclusive OR, or OR; can be performed with the complement of the operand in register 10 if desired.

Fixed point binary arithmetic operations are performed when control 40 does not provide a Sign signal on conductor 49, a Plus signal on conductor 51, a Decimal signal on conductor 44 and a Zone Decimal signal on conductor 45. The absence of the AND signal on conductor 41 and the XOR signal on conductor 42 enables function control circuit 130 to pass the results of subtractor 100 to the six correct circuit 250 and the absence of the Decimal signal on conductor 44 enables the outputs of the subtractor 100 which have passed through function control circuit 130 to pass through the six correct circuit 250 without a six correct operation being performed.

The six correct circuit 250 thus includes logic for passing outputs from function control circuit 130 without performing a six correct operation and logic for doing a six correct operation on the outputs of function control circuit 130. The logic for performing the six correct operation takes into account the sign position of decimal data and the sign and zone positions of zoned decimal data.

Figure 3:
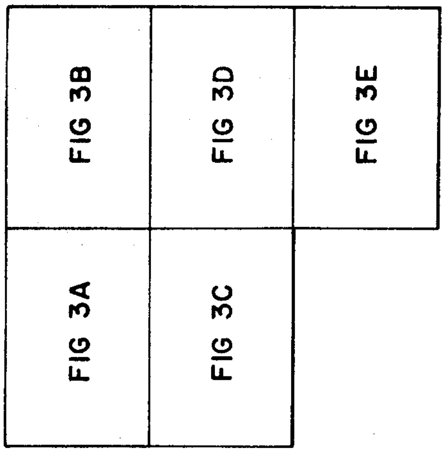
FIG. 3 is a diagram illustrating the arrangement of FIGS. 3A, 3B, 3C, 3D and 3E, and FIGS. 3A, 3B, 3C, 3D and 3E taken together constitute a logic circuit diagram illustrating the invention.

The foregoing description generally describes the invention. A more detailed description will now be given in connection with the invention as illustrated in FIGS. 3A, 3B, 3C, 3D and 3E. Register 10 in FIG. 3 is shown as consisting of a latch 11 for bit positions 0–7 of the register. The input data as previously explained is represented in coded form by bits 0–7 inclusive. The arithmetic and logic unit of the present invention would generally be incorporated in a computer system and thus the input data would come from the computer system. Of course, the invention could also be incorporated in a data controller and other like devices which require arithmetic and logical functions. The input data bits forming the data byte for operand A are applied to AND circuits 12 which are gated by the Load A signal on conductor 46 from control 40. The AND circuits 12 control the setting of associated latches 11. Latches 11 are reset by a Reset A signal from control 40 on conductor 58. Both the set and reset outputs of latches 11 are connected to inputs of complement circuit 60.

Complement circuit 60 includes logic which is identical for bits 0 and 4, bits 1 and 5, bits 2 and 6, and bits 3 and 7. The data in latches 11 are transferred through the complement logic 60 under control of a XFR A signal and a Complement signal from conrol 40 on conductors 41 and 48 respectively. The XFR A signal is applied to AND circuits 77 and 79. The Complement signal is applied to AND circuit 79 and to inverter 80 which has its output connected to AND circuit 77. The output from AND circuits 77 and 79 control complement circuit 60 so as to transfer the data in latches 11 in true and complement form respectively. In this connection, the output of AND circuit 77 is connected to condition AND circuits 62, 68, 72, 74, 81, 88, 92, and 94. These AND circuits pass the data in latches 11 in true form via associated OR circuits 64, 69, 73, 76, 84, 89, 93 and 96.

The one's complement of the data in latches 11 is formed by AND circuits 61, 66, 70, 75, 81, 86, 90 and 95. AND circuits 61, 66, 70, 81, 86 and 90 are conditioned by outputs from AND circuit 79 and inverter 98. AND circuits 75 and 95 are conditioned by the output of AND circuit 79. Inverter 98 forms a $\overline{DEC}$ signal by inverting the output of OR circuit 97 which has inputs connected to control 40 for receiving the Decimal and Zoned DEC control signals on conductors 44 and 45 respectively. The absence of the conditioning signal from inverter 98 enables AND circuits 75 and 95 to be used for forming both the one's and nine's complement. The nine's complement of the data in latches 11 is formed by AND circuits 63, 65, 67, 71, 75, 83, 85, 87, 91 and 95. AND circuits 63, 65, 67, 71, 83, 85, 87 and 91 are conditioned by signals from AND circuit 79 and OR circuit 97. The conditioning of AND circuits 75 and 95 is as previously described.

The output of OR circuits 64, 69, 73, 76, 84, 89, 93 and 96 are connected as inputs to subtractor 100, to inputs of function control circuit 130 and to inputs of the borrow look ahead circuit 170. Subtractor 100 performs the function B-A-Borrow. This function can be achieved by $A \veebar B \veebar$ Borrow. Thy function $A \veebar B$ is performed by exclusive OR circuits 101–108 inclusive which have inputs connected to the outputs of complement circuit 60 and register 20. The data in register 10 is passed in true form via complement circuit 60 to exclusive OR circuits 101–108 when subtraction is being performed and in complement form for addition. The data in register 20 is always passed to exclusive OR circuits 101–108 in true form. The outputs of exclusive OR circuits 101–108 are connected to inputs of exclusive OR circuits 109–116 respectively. Exclusive OR circuits 109–115 each have a borrow input from borrow look ahead circuit 170. Exclusive OR circuit 116 which corresponds to the low order bit position has an input to receive a Borrow In signal from control 40 on conductor 43. It should be noted that the outputs of exclusive OR circuits 101–108 are also connected to inputs of borrow look ahead circuit 170. The outputs of exclusive OR circuits 109– 116 are connected to inputs of function control circuit 130.

Function control circuit 130 includes AND circuits 131, 135, 139, 143, 147, 151, 155 and 159 for performing a logical AND operation with operands A and B in registers 10 and 20 respectively. These AND circuits are conditioned by an AND signal on conductor 41 from control 40. The exclusive OR function of operand A with operand B as previously mentioned is performed by exclusive OR circuits 101–108 in subtractor 100. The outputs of these exclusive OR circuits are connected to inputs of corresponding AND circuits 133, 137, 141, 145, 149, 153, 157, and 161 of function control circuit 130. These AND circuits are conditioned by an XOR signal on conductor 42 from control 40.

The logical OR function is performed when control 40 simultaneously provides an AND signal on conductor 41 and an XOR signal on conductor 42. The absence of an AND signal on conductor 41 and an XOR signal on conductor 42 conditions function control 130 for an arithmetic operation. This is accomplished by connecting conductors 41 and 42 to inputs of inverters 163 and 164 respectively. The outputs of inverters 163 and 164 are connected to condition AND circuits 132, 136, 140, 144, 148, 152, 156 and 160. These AND circuits also receive inputs from exclusive OR circuits 109–116 respectively. It should be noted that the outputs of AND circuits 131, 132 and 133 are connected to inputs of OR circuit 134. Inputs of OR circuits 138, 142, 146, 150, 154, 158, and 162 are connected to outputs of associated AND circuits in a similar manner. The outputs of these OR circuits are connected to inputs of the six correct circuit 250. However, before describing the six correct circuit 250, the borrow look ahead circuit 170 which has inputs from exclusive OR circuits 101–108 inclusive will be described.

The borrow look ahead circuit 170 provides for higher speeds of operation because the borrow does not have to be propagated from position to position in a serial manner. In other words, the borrow for each bit position is developed in parallel. The borrow for the low order bit position bit 7 can be expressed by the following equation: $\overline{B7}A7+\text{Borrow In }(A7B7+\overline{A7}\,\overline{B7})$ or $\overline{B7}A7+\text{Borrow In }(\overline{A7 \veebar B7})$ or $\overline{B7}A7+\text{Borrow In }\overline{OE7}$ or G7+Borrow In P7 where G7 represents the borrow generate function and P7 represents the borrow the borrow propagate function. Similarly, the borrow for bit 6 can be represented by the equation $\overline{B6}A6+B7(\overline{A6 \veebar B6})$ or G6+B7P6 or G6+P6G7+P6P7 Borrow In. The borrows for the remaining bits, i.e., bits 5–0 inclusive are developed in a similar manner.

The function $\overline{B7}A7$ is performed by inverter 171 and AND circuit 172. Inverter 171 has its input connected to the output of AND circuit 49 which receives the bit 7 output of register 20 containing operand B. AND circuit 49 is conditioned by the XFR B signal on conductor 57 from control 40. The output of inverter 171 is connected to AND circuit 172 which also has an input connected to the output of OR circuit 96. The output of AND circuit 172 is connected to an input of OR circuit 227. The output of OR circuit 227 is the borrow for bit 7. OR circuit 227 also has an input from AND circuit 226. AND circuit 226 receives a Borrow In signal on conductor 43 from control 40. AND circuit 226 also receives an input from inverter 179 which has its input connected to the output of exclusive OR circuit 108. Thus, AND circuit 226 performs the function of ANDing the Borrow In signal with the quantity of $(\overline{A7 \veebar B7})$.

The borrow for bit 6 is developed via OR circuit 225 which has inputs from AND circuits 174, 223, and 224. AND circuit 174 has an input from OR circuit 93 and an input from the output of inverter 173. The input of inverter 173 is connected to an AND circuit, not shown having an input connected to the output bit 6 of register 20 and gated by XFR B. AND circuit 223 has an input connected to the output of inverter 175, an input connected to conductor 43 for receiving the Borrow In signal, and an input connected to the output of inverter 179. Inverter 175 has its input connected to the output of exclusive OR circuit 107. The inputs to AND circuit 224 are connected to AND circuit 172 and inverter 175.

The borrow signal for bit 5 is taken from the output of OR circuit 222 which has inputs connected to AND circuits 177, 219, 220 and 221. AND circuit 219 has inputs connected to inverters 175, 178, 179, and conductor 43. AND circuit 220 has inputs connected to inverters 172, 175, and 178. AND circuit 221 has inputs connected to AND circuit 174 and inverter 178. AND circuit 177 has an input connected to OR circuit 89 and an input connected to inverter 176. Inverter 176 has its input connected to the bit 5 output of register 20. Inverter 178 has its input connected to the output of exclusive OR circuit 106.

The borrow for bit 4 is taken from the output of OR circuit 218, however, as previously indicated, the borrow for bit 4 must be propagated through the sign and zone positions for Zone Decimal operations. Hence, the borrow for bit 4 is taken from OR circuit 186 which receives the borrow for bit 4 from OR circuit 218 via AND circuit 185.

The inputs of OR circuit 218 are connected to AND circuits 181, 214, 215, 216, and 217. AND circuit 181 has an input connected to the output of OR circuit 84 and an input connected to the output of inverter 180. Inverter 180 has its input connected to an AND circuit not shown having an input connected to the bit 4 output of register 20 and gated by XFRB. AND circuit 214 has inputs connected to the outputs of inverters 175, 178, 179 and 182 and to conductor 43 for receiving the Borrow In signal from control 40. AND circuit 215 has inputs connected to the outputs of inverters 175, 178 and 182 and AND circuit 172. AND circuit 216 has its inputs connected to outputs of inverters 178 and 182 and AND circuit 174. AND circuit 217 has its inputs connected to the output of inverter 182 and the output of AND circuit 177. Inverter 182 has its input connected to the output of exclusive OR circuit 105.

The output of OR circuit 218 is connected to inputs of inverter 285 and AND circuits 184, 229, 274 and 276. AND circuit 184 has its other input connected to the output of inverter 183 which has its input connected to conductor 49 for receiving the Sign signal from control 40. The output of AND circuit 184 is connected to an input of OR circuit 186 from which the borrow for bit 4 is taken. The other input of OR circuit 186 is connected to the output of AND circuit 185. AND circuit 185 has inputs connected to conductors 43 and 49 for receiving the Borrow In and Sign control signals respectively from control 40. Thus, if the Sign control signal is not simultaneously present with the Borrow In signal from control 40, the borrow developed by OR circuit 218 will be passed by AND circuit 184 and OR circuit 186 to become the borrow signal for bit 4. If the Sign control signal is simultaneously present with the Borrow In signal, then the Borrow In signal is passed by AND circuit 185 and OR circuit 186 to become the borrow signal for bit 4.

The signals passed by an OR circuit 218 will be passed by AND circuit 229 when there is a Zone DEC signal from control 40. The output of AND circuit 229 is connected to an input of OR circuit 230. The output of OR circuit 230 is the Borrow Out signal for the arithmetic and logic unit. OR circuit 230 also has an input connected to the output of AND CIRCUIT 228. AND circuit 228 has an input connected to the output of inverter 199 and an input connected to the output of OR circuit 204. The output of OR circuit 204 provides a borrow for bit zero to AND circuit 228 whereas the inverter 199 provides a $\overline{\text{Zone DEC}}$ signal. It is thus seen that the Borrow Out signal from OR circuit 230 is taken from OR circuit 218 when in a zoned decimal operation and from OR circuit 204 when not in a zoned decimal operation. In other words, when operating with zoned decimal data, the borrow for bit 4 becomes the borrow out for the arithmetic and logic unit and for decimal and binary operations the borrow for bit zero becomes the borrow out signal.

The borrow for bit 3 is taken from OR circuit 213 which has inputs connected to the outputs of AND circuits 188 and 212. AND circuit 188 has an input connected to the output of OR circuit 76 and an input connected to the output of inverter 187. Inverter 187 has its input connected to an AND circuit not shown having its input connected to the bit 3 output of register 20 and gated by XFRB. AND circuit 212 has an input connected to the output of OR circuit 186 and an input connected to the output of inverter 191. Inverter 191 has its input connected to the output of exclusive OR circuit 104. This arrangement enables the borrow for bit 4 to be propagated to the higher order bit 3.

The borrow for bit 2 is taken from OR circuit 211 which has inputs connected to AND circuits 190, 209, and 210. AND circuit 190 has its inputs connected to OR circuit 73 and inverter 189. Inverter 189 has its input connected to an AND circuit not shown having an input connected to the bit 2 output of register 20 and gated by XFRB. AND circuit 209 has inputs connected to OR circuit 186, inverter 191, and inverter 195. Inverter 195 has its input connected to the output of exclusive OR circuit 103. AND circuit 210 has inputs connected to the output of AND circuit 188 and to the output of inverter 195. Thus, the borrow for bit 2 will be generated whenever any of the AND circuits 190, 209 or 210 have a one bit output.

The borrow for bit one is taken from OR circuit 208 which has inputs connected to AND circuits, 193, 205, 206 and 207. AND circuit 193 has inputs connected to the output of OR circuit 69 and the output of inverter 192. Inverter 192 has its input connected to the output of AND circuit 39 having an input connected to the bit 1 output of register 20 and gated by XFR B. AND circuit 205 has inputs connected to OR circuit 186, and inverters 191, 194 and 195. Inverter 194 has its input connected to the output of exclusive OR circuit 102. AND circuit 206 has inputs connected to AND circuit 188 and inverters 194 and 195. AND circuit 207 has inputs connected to AND circuit 190 and inverter 194.

The borrow for bit zero is taken from OR circuit 204 as previously indicated. OR circuit 204 has inputs connected to AND circuits 197, 200, 201, 202 and 203. AND circuit 197 has an input connected to the output of OR circuit 64 and to the output of inverter 196. Inverter 196 has its input connected to the output of AND circuit 28 having an input connected to the bit zero output of register 20 and gated by XFR B. AND circuit 200 has inputs connected to OR circuit 186, and inverters 191, 194, 195 and 198. Inverter 198 has its input connected to the output of exclusive OR circuit 101. AND circuit 201 has inputs connected to AND circuit 188 and inverters 194, 195 and 198. AND circuit 202 has inputs connected to AND circuit 190 and inverters 194 and 198. AND circuit 203 has inputs connected to AND circuit 193 and inverter 198. The borrow for bit zero is passed by AND circuit 228 and OR circuit 230 to become the Borrow Out signal when the Zone DEC signal is absent from control 40.

The borrow signals for bits 1–7 inclusive, i.e., the outputs from OR circuits 208, 211, 213, 186, 222, 224 and 227 are connected to inputs of exclusive OR circuits 109, 110, 111, 112, 113, 114 and 115 respectively of subtractor 100. It should be noted that the borrow look ahead circuit 170 has outputs which are connected to inputs of the six correct circuit 250. The output of OR circuit 230 besides carrying the Borrow Out signal is connected to the input of inverter 282 and AND circuits 259 and 261. Also, as previously indicated, the output of OR circuit 218 is connected to inputs of inverter 285 and AND circuits 274 and 276. It should also be noted that the logical circuits for the low order bits 4–7 are identical to those for the high order bits 0–3.

The six correct circuit 250 includes logic for performing the six correct operation when doing decimal and zoned decimal arithmetic. The six correct operation is dependent on the Borrow Out signal from OR circuit 230 of the borrow look ahead circuit 170 for bits 0–3 and the borrow output of OR circuit 218 for bits 4–7. If the outputs from function control circuit 130 are represented by R0–R7 for bits 0–7 and the Borrow Out signal is represented by B then the six correct circuit 250 performs a six correct operation according the following equations. For bits 0 and 7, the data out signal from the six correct circuit 250 is $\overline{B}R0+R0R1R2$ where B is the Borrow Out signal from OR circuit 230 and inverter 282 for Data Out 0 and OR circuit 218 and inverter 285 for data out 4. The equation for Data Out 1 and Data Out 5 is $\overline{B}R1+R1\overline{R2}+B\overline{R1}R2$. The borrow B is the same for Data Out 1 and 5 as for Data Out 0 and 4 respectively. The six correct equation for Data Out 2 and Data Out 6 is $\overline{B}R2+B\overline{R2}$ where B represents borrow in the mannner previously indicated for Data Out 0 and 4. The six correct equation for Data Out 3 and Data Out 7 is R3. The Data Out signals, Data Out 0-Data Out 7 inclusive, are taken from OR circuits 254, 260, 265, 266, 270, 280 and 281 respectively.

OR circuit 254 has a forced output for the Data Out 0 bit when the operation involves zoned decimal data. The Zone DEC signal when provided by control 40 on conductor 45 forces the Data Out 0 bit. AND circuit 251 passes the true output for the Data Out 0 bit when performing operations other than decimal or zoned decimal, i.e., when control 40 does not provide the Decimal control signal on conductor 44 or the zoned DEC signal on conductor 45 whereby inverter 98 conditions AND circuit 251 to pass the R0 output from OR circuit 134 of function control circuit 130. AND circuits 252 and 253 are necessary for the six correct function. AND circuit 252 develops the Data Out 0 bit when there is an absence of a Borrow Out signal from OR circuit 230. AND circuit 253 developes the Data Out zero bit when there is an output from OR circuit 138 and an output from OR circuit 142.

The Data Out 1 bit is taken from OR circuit 260 and is forced by the Zone DEC signal on conductor 45 from control 140. AND circuit 256 functions to develop the true output for Data Out 1 bit and has inputs connected to OR circuit 138 and to the output of inverter 98 for receiving the $\overline{DEC}$ signal. AND circuits 257 and 258 develop Data Out 1 bit signals for the six correct operation. ANd circuit 257 has inputs connected to OR circuit 138 and inverter 282. AND circuit 258 has inputs connected to OR circuit 138 and inverter 284. AND circuit 259 also develops a Data Out 1 bit signal for the six correct operation and has inputs connected to inverter 283, OR circuit 142, OR circuit 230 and OR circuit 97 for receiving the DEC signal.

The Data Out 2 bit signal is passed by OR circuit 265 which has inputs connected to the outputs of AND circuits 261, 262, 263, and 264. AND circuit 261 is used for six correct and has inputs connected to inverter 284, OR circuit 230, OR circuit 97 and inverter 199. AND circuit 262 is also used for six correct and has inputs connected to OR circuit 142, inverter 282, and inverter 199. AND circuit 263 passes the true output for the Data Out 2 bit. This AND circuit has inputs connected to OR circuit 142, inverter 98, and inverter 199. AND circuit 264 provides a Data Out 2 bit when forcing a plus sign. This AND circuit has inputs connected to conductors 45 and 51 for receiving control signals Zone DEC and Plus respectively from control 40.

The Data Out 3 bit is taken from OR circuit 266. There is a data out 3 bit whenever OR circuit 146 passes a bit to OR circuit 266 or when in the zoned decimal mode of operation, i.e., when control 40 provides a Zone DEC signal on conductor 45.

The Data Out 4 bit is taken from OR circuit 270. This OR circuit passes a bit when control 40 provides a Sign signal on conductor 49. AND circuit 267 passes the true output for the Data Out 4 bit when OR circuit 150 provides a one bit signal and there is a conditioning $\overline{DEC}$ signal from inverter 98. AND circuits 268 and 269 are conditioned during the six correct operation. AND circuit 268 passes a one bit from OR circuit 150 when conditioned by an output from inverter 285. AND circuit 269 passes a one bit signal when there are one bit signals simultaneously present from OR circuits 150, 154, and 158.

OR circuit 275 passes the Data Out 5 bit signal from AND circuits 271, 272, 273 or 274. The Data Out 5 bit is forced via OR circuit 275 when control 40 provides a Sign control signal on conductor 49. AND circuit 271 functions to pass a one bit signal from OR circuit 154 in true form when inverter 98 provides a $\overline{DEC}$ signal. AND circuits 272, 273 and 274 are involved for the six correct operation. AND circuit 272 has inputs connected to OR circuit 154 and inverter 285. AND circuit 273 has inputs connected to OR circuit 154 and inverter 287. AND circuit 274 has inputs connected to inverter 286, OR circuit 158, OR circuit 218 and OR circuit 97.

The Data Out 6 bit is taken from OR circuit 280. This OR circuit has inputs from AND circuits 276, 277, 278, and 279. AND circuits 276 and 277 are involved in the six correct operation. AND circuit 276 has inputs connected to inverter 287, OR circuit 218, OR circuit 97 and inverter 183. AND circuit 277 has inputs connected to OR circuit 158, inverter 285, and inverter 183. The true output for the Data Out 6 bit is passed by AND circuit 278. AND circuit 278 has an input connected to OR circuit 158 and is gated by a $\overline{DEC}$ signal from inverter 98 and a $\overline{Sign}$ signal from inverter 183. AND circuit 279 functions to force a sign bit and has inputs for receiving the Sign control signal and the Plus control signal on conductors 49 and 51 respectively. The Data Out 7 bit is taken from OR circuit 281 which has inputs connected to OR circuit 162 and to conductor 49 for receiving the Sign control signal from control 40.

The operation of the arithmetic and logic unit will be best understood by the use of examples. An example of a logical AND operation illustrated how the arithmetic and logic unit passes true outputs from registers 10 and 20 to function control circuit 130 where operand A is anded with operand B. The results of the logical AND operation are passed in true form through the six correct circuit 250 which passes the results in true form to the data outputs of the arithmetic and logic unit.

Example of AND Operation

| | 01234567 |
|---|---|
| Operand A | 01101011 |
| Operand B | 00101010 |
| Results | 00101010 |

Operands A and B reside in registers 10 and 20 respectively. Latches 11 of register 10 for bits 0, 3 and 5 are reset and latches 11 for bits 1, 2, 4, 6 and 7 are set. The flip flops 29 of register 20 for bits 0, 1, 3, 5 and 7 are reset and flip flops 29 for bits 2, 4 and 6 are set. Control 40 first provides an XFRA signal which conditions AND circuits 77 and 79, however, only AND circuit 77 will pass a signal because control 40 is not simultaneously providing a Complement signal on conductor 48. The signal from AND circuit 77 conditions AND circuits 62, 68, 72, 74, 81, 88, 92 and 94 to transfer the bit conditions in latches 11 through complement circuit 60. For this example, only AND circuits 68, 72, 81, 92 and 94 will pass a signal representing a one bit. The signals from AND circuits 62, 68, 72, 74, 81, 88, 92 and 94 are passed via OR circuits 64, 69, 73, 76, 84, 89, 93 and 96 to AND circuits 131, 135, 139, 143, 147, 151, 155 and 159. These AND circuits also have inputs from AND circuits 28, 39–49 which are gated by the XFRB signal from control 40.

The logical AND function is performed when control 40 provides an AND signal on conductor 41. The results of the AND operation are that AND circuits 139, 147 and 155 pass a one bit signal and AND circuits 131, 135, 143, 151 and 159 pass a zero bit signal. The OR circuits 134, 138, 142, 146, 150, 154, 158 and 162 pass the results to AND circuits 251, 256, 263, OR circuit 266, AND circuits 267, 271, 278, and OR circuits 281 respectively. The $\overline{\text{DEC}}$ signal is developed by inverter 98 to condition the AND circuits just mentioned because control 40 is not providing a Decimal or Zone DEC signal on line 44 or 45. Thus, these logical circuits pass the results to the outputs of the arithmetic and logic unit via OR circuits 254, 260, 265, 266, 270, 275, 280 and 281. Although the operands were presented to subtractor 100, the AND signal on conductor 41 from control 40 inhibited AND circuits 132, 136, 140, 144, 148, 152, 156 and 160 via inverter 163 so that the results of the arithmetic operation would not pass through the function control circuit 130.

Example of An Exclusive OR Operation

| | 01234567 |
|---|---|
| Operand A | 10101101 |
| Operand B | 01100110 |
| Results | 11001011 |

When performing the Exclusive OR Operation, operands A and B are loaded into registers 10 and 20 respectively in the same manner as for the logical AND operation. Operand A passes through the complement circuit 60 in true form to subtractor 100 and to function control circuit 130. Of course, operand B is also passed to subtractor 100 and function control circuit 130. This time, the XOR signal on conductor 42 conditions AND circuits 133, 137, 141, 145, 149, 153, 157 and 161 and inhibits AND circuits 132, 136, 140, 144, 148, 152, 156 and 160 via inverter 164.

Exclusive OR circuits 101–108 inclusive perform the exclusive OR function with operands A and B and the results are applied to the AND circuits conditioned by the XOR signal. In this particular instance, AND circuits 133, 137, 149, 157 and 161 will pass one bits and AND circuits 141, 145 and 153 will pass zero bits. These results are then passed via OR circuits 134, 138, 142, 146, 150, 154, 158 and 162 to the six correct circuit 250 in the same manner as for the logical AND operation, i.e., results are passed to AND circuits 251, 256, 263, OR circuit 266, AND circuits 267, 271, 278 and OR circuit 281. These logical circuits then pass the results to the outputs of the arithmetic and logic unit via OR circuits 254, 260, 265, 266, 270, 275, 280 and 281.

Example of a Logical OR Operation

| | AND Operation |
|---|---|
| | 01234567 |
| Operand A | 10101101 |
| Operand B | 01100110 |
| Results AND | 00100100 |

| | Exclusive OR Operation |
|---|---|
| | 01234567 |
| Operand A | 10101101 |
| Operand B | 01100110 |
| Results XOR | 11001011 |

| | |
|---|---|
| Results AND | 00100100 |
| Results XOR | 11001011 |
| Results OR | 11101111 |

The logical OR operation is performed with operands A and B residing in registers 10 and 20 respectively. Operand A is passed in true form through complement circuit 60 to subtractor 100 and function control logic 130. Operand B is passed directly to subtractor 100 and function control circuit 130. This time, control 40 simultaneously provides an AND signal on conductor 41 and an XOR signal on conductor 42. Operands A and B are ANDed by AND circuits 131, 135, 139, 143, 147, 151, 155 and 159. Operands A and B are exclusive ORed by AND circuits 133, 137, 141, 145, 149, 153, 157 and 161. Referring to the example of the Logical OR Operation it is seen that AND circuits 139 and 151 pass one bits and that the other AND circuits performing the logical AND function, pass zero bits. It is also seen that AND circuits 133, 137, 149, 157 and 161 pass one bits for the XOR function and that the other AND circuits for this function pass zero bits. The results of these two logical functions are passed through OR circuits 134, 138, 142, 146, 150, 154, 158 and 162 where OR circuit 146 is the only OR circuit which does not pass a one bit. The outputs of these OR circuits are then passed to the outputs of the arithmetic and logic unit in the same manner as previously described for the logical functions of AND and exclusive OR.

Binary Add

| | | |
|---|---|---|
| Example A | | |
| | 01234567 | |
| Operand B | 01001001 | +73 |
| Operand A | 00001001 | (+) + 9 |
| | | 82 |
| | 01234567 | |
| Operand B | 01001001 | |
| Operand A 1's Comp. | 11110110 | |
| Exclusive OR | 10111111 | |
| | 01234567 | |
| Exclusive OR | 10111111 | |
| Borrows | 11101101 | |
| Exclusive OR Results | 01010010 | = +82 |
| Borrow Out = 1 | | |
| Example B | | |
| | 01234567 | |
| Operand B | 01001001 | +73 |
| Operand A | 11110111 | (+) − 9 |
| | 01234567 | |
| Operand B | 01001001 | |
| Operand A 1's Comp. | 00001000 | |
| Exclusive OR Results | 01000000 | = +64 |
| Borrow Out = 0 | | |

Binary arithmetic is performed with fixed point operands, i.e., the high order bit position of the operand is the sign position where a zero bit signifies a positive number and a one bit denotes a negative number. All negative numbers are in the two's complement form. Although no examples are given, binary arithmetic could be performed by this arithmetic and logic unit in the one's complement or sign magnitude notation. Example A of the Binary Add illustrates the addition of two positive numbers. However, when performing addition, operand A is complemented by complement circuit 60 and passed to subtractor 100 and function control circuit 130. Operand B is passed directly to subtractor 100 and function control circuit 130. This time, only AND circuits 132, 136, 140, 144, 148, 152, 156 and 160 are conditioned by the absence of the AND and XOR signals on conductors 41 and 42 respectively from control 40. Complement circuit 60 performs the one's complement with the A operand. The A operand in the one's complement form is presented to exclusive OR circuits 101–108 inclusive together with the B operand. Of these exclusive OR circuits, only exclusive OR circuit 102 will pass a zero bit. All of the other exclusive OR circuits will pass a one bit.

The Borrow In signal is applied to exclusive OR circuit 116 together with the output of exclusive OR circuit 108. The borrows for bits 1–7 inclusive from the borrow look ahead circuit 170 are applied to exclusive OR circuits 109–115 inclusive, respectively. The borrow for bit 7 is zero because the conditions of AND circuit 172 were not satisfied and $\overline{OE7}$ is zero and therefore the conditions of AND circuit 226 were not satisfied. Thus, OR circuit 227 passed a zero bit to exclusive OR circuit 115. The borrow for bit 6 is a one bit because the conditions of AND circuit 174 were satisfied and thus OR circuit 224 passed a one bit to exclusive OR circuit 114. The borrow for bit 5 is a one bit because the inputs to AND circuit 177 were satisfied and thus OR circuit 222 passed a one bit to exclusive OR circuit 113. The borrow for bit 4 is zero because the AND circuits connected to OR circuit 218 are not satisified. Further, the satisfied. control signal is not available on conductor 49 and thus the AND circuits 184 and 185 are not satisfied. Therefore, OR circuit 186 passes a zero bit to exclusive OR circuit 112. The borrow for bit 3 is a one bit because the inputs to logical AND circuit 188 are satisfied and therefore OR circuit 213 passes a one bit to exclusive OR circuit 111. The borrow for bit 2 is a one bit because the inputs to AND circuit 190 are satisfied and therefore OR circuit 211 passes a one bit to exclusive OR circuit 110. The borrow for bit 1 is a one bit because AND circuit 207 is satisfied and therefore OR circuit 208 passes a one bit to exclusive OR circuit 109. The outputs of exclusive OR circuits 109–116 inclusive become the results of the binary add operation and it is seen from the example that the correct answer was obtained. The results are passed by AND circuits 132, 136, 140, 144, 148, 152, 156 and 160 to the outputs of the arithmetic and logic units via AND circuits 251, 256, 263, OR circuit 266, AND circuits 267, 271, 278, and OR circuit 281 respectively. These logical circuits passed the results via OR circuits 254, 260, 265, 266, 270, 275, 280 and 281 in the manner as previously indicated.

The Binary Add Example B illustrates the operation where operand A is a negative number represented in the two's complement form. This operand A is complemented by complement circuit 60 in the same manner as a positive binary number is complemented. The complemented binary number is then applied to exclusive OR circuits 101–108 inclusive together with operand B. The results are then passed to exclusive OR circuits 109–116 inclusive together with the borrows for bits 1–7 and the Borrow In signal. Note that the Borrow In signal is a one bit and the borrows for bits 1–7 inclusive are zero bits. The results from exclusive OR circuits 109–116 inclusive are as shown in the example and it is seen that the correct answer was obtained.

Binary Subtract

Example A

| | | |
|---|---|---|
| | 01234567 | |
| Operand B | 01001001 | +73 |
| Operand A | 00001001 | (−) + 9 |
| Exclusive OR | 01000000 | +64 |
| Borrow | 00000000 | |
| Exclusive OR Results | 01000000 | = +64 |
| Borrow Out = 0 | | |

Example B

| | | |
|---|---|---|
| | 01234567 | |
| Operand B | 01001001 | +73 |
| Operand A | 11110111 | (−) − 9 |
| Exclusive OR | 10111110 | +82 |
| Borrow | 11101100 | |
| Exclusive OR Results | 01010010 | = +82 |
| Borrow Out = 0 | | |

Binary subtract, examples A and B, take place with operands A and B being applied in true form to exclusive OR circuits 101–108 inclusive. The outputs of these exclusive OR circuits are applied to corresponding exclusive OR circuits 109–116 inclusive together with borrows. In example A the outputs of exclusive OR circuits 101 and 103–108 inclusive are zero bits and the output of exclusive OR circuit 102 is a one bit. Since this is a binary subtract operation, the Borrow In signal is a zero bit. All other borrows are also zero bits. The outputs of exclusive OR circuits 109–116 inclusive yield the results. Only exclusive OR circuit 110 has a one bit output, all the rest have zero bit outputs. It is seen that the correct results have been obtained and that Borrow Out is a zero bit.

The binary subtract operation for example B is similar to example A but a negative number, i.e., a number in two's complement form is being subtracted, Again, both operands are presented in true form to exclusive OR circuits 101–108 inclusive. All of these exclusive OR circuits except 102 and 108 have a one bit output. The Borrow In signal is a zero bit. The results are taken from exclusive OR circuits 109–116 and it is seen that the correct answer has been obtained. The Borrow Out signal is a zero bit.

DECIMAL OPERATION

| | | | | | |
|---|---|---|---|---|---|
| | | | | | 01234567 |
| Operand B | +37 | 8 | Low Order Digits | Operand B | 10001111 |
| Operand A | +12 | 6 | | Operand A | 01101111 |
| | 50 | 4 | | | |
| | | | | | 01234567 |
| | | | | Operand B | 10001111 |
| | | | 9's comp | Operand A | 00111010 |
| | | | Exclusive OR | | 10110101 |
| x=don't care | | | Borrows | | 1111xxxx |
| | | | Results | | 01001111 |
| | | | Borrow Out=0 | | sign |
| | | | | | 01234567 |
| | | | High and 2nd Order Digits | Operand B | 00110111 |
| | | | | Operand A | 00010010 |
| | | | | | 01234567 |
| | | | | Operand B | 00110111 |
| | | | 9's comp | Operand A | 10000111 |
| | | | Exclusive OR | | 10110000 |
| | | | Borrows | | 00000000 |
| | | | Results | | 10110000 |
| | | | Borrow Out=1: Six correct | | 0110 |
| | | | | | 01010000 |

The Decimal Operation is illustrated with three digits because the low order digit carries the sign in the low order half of the byte. The next byte carries the high order and second order digits. The A and B operands are applied a byte at a time to registers 10 and 20 respectively. The byte in register 10 is a nine's complemented because control 40 is furnishing a Decimal control signal on conductor 44 and a Complement signal on conducotr 48. The nine's complement of this A operand byte is applied to exclusive OR circuits 101–108 together with the operand B byte. Exclusive OR circuits 101, 103, 104, 106 and 108 pass one bits and the other exclusive OR circuits of this group pass zero bits. The borrows for bits 0–3 are one bits. the borrows for bits 4–7 are developed but they amount to a don't care situation because the Sign control signal on conductor 41 causes OR circuits 270, 275, 280 and 281 to pass one bits which represent the sign. The low order digit is equal to a decimal four and this corresponds with the correct answer for that digit position.

The next byte contains the second order digit in the low half of the byte and the high order digit in the high half of the byte. Operand A for this byte is complemented and the outputs of exclusive OR circuits 101, 103 and 104 pass one bits and the remaining exclusive OR circuits 101, 103 and 104 pass one bits and the remaining exclusive OR circuits of this group of exclusive OR circuits pass zero bits. There is no Borrow In signal from control 40. The borrow for bits 1–7 inclusive are zero bits. These borrows, i.e., all zero bits, are applied to exclusive OR circuits 109–116 inclusive. It should be noted that the Sign signal is not available on conductor 49 from control 40 during this operation. Further, the Borrow Out signal is a one bit. The Borrow Out signal is applied to the six correct circuit 250 and a six correct operation takes place. However, it should be noted that the six correct operation takes place only with the high order bits 0–3. Also, it should be noted that the results after the six correct operations agree with the decimal digits obtained by addition, i.e., five and zero in the high and low halves of the byte respectively.

ZONED DECIMAL

| | | | | |
|---|---|---|---|---|
| | | | | 01234567 |
| Operand B | +0 8 8 | Low Order Digits | Operand B | 11111000 |
| Operand A | +0 6 6 | | Operand A | 11110110 |
| | +1 5 4 | | | |
| | | | | 01234567 |
| | | | Operand B | 11111000 |
| | | 9's comp | Operand A | 10100011 |
| | | Exclusive OR | | 01011011 |
| X=don't care | | Borrows | | xxxx1111 |
| | | Exclusive OR Results | | 11110100 |
| | | Borrow Out=0 | | sign |
| | | | | 01234567 |
| | | Second Order Digits | Operand B | 11111000 |
| | | | Operand A | 11110110 |
| | | | | 01234567 |
| | | | Operand B | 11111000 |
| | | 9's comp | Operand A | 10100011 |
| | | Exclusive OR | | 01011011 |
| | | Borrows | | xxxx1110 |
| | | Exclusive OR Results | | 11110101 |
| | | Borrow Out=0 | | zone |
| | | | | 01234567 |
| | | High Order Digits | Operand B | 11110000 |
| | | | Operand A | 11110000 |
| | | | | 01234567 |
| | | | Operand B | 11110000 |
| | | 9's comp | Operand A | 10101001 |
| | | Exclusvie OR | | 01011001 |
| | | Borrows | | xxxx1110 |
| | | Exclusive OR Results | | 11110111 |
| | | Borrow Out=1: six correct | | 0110 |
| | | | | 11110001 |
| | | | | zone |

The Zoned Decimal example illustrates how the sign and zone bits are forced for the high order half of the byte. Also, the Borrow In signal is not propagated to the high order half of the byte as in the case of a Decimal operation which has just been illustrated. The first bytes of operands A and B are placed in registers 10 and 20 respectively. The byte for operand A is complemented to form the nine's complement because control 40 is providing a Complement signal on conductor 48 and a Zone DEC signal on conductor 45. The nine's complement of this low order byte of operand A is applied to exclusive OR circuits 101–108 inclusive together with the low order byte of operand B. A Borrow In signal is applied by control 40 on conductor 43. The Zone DEC signal is applied to conductor 45. The borrows for bits 4–7 are one bits and the borrows for bits 0–3 represent a don't care situation because the Zone DEC signal on conductor 45 forces one bits at the outputs of OR circuits 254, 260, 265 and 266. The borrows for bits 4–7 are applied to exclusive OR circuits 113–116 inclusive to develop the low order digit for the results. the Borrow Out signal is a zero bit in this instance because the inputs to AND circuit 229 are not satisfied.

The next or second order bytes for operands A and B contain bits representing digits for bits 4–7 and zones for bits 0–3. The operation takes place in substantially the same manner as for the low order bytes just described. Also, in this instance, the Borrow Out is a 0 bit. The next or high order bytes of the operands are operated upon in a similar manner, however, the Borrow Out is a one bit and therefore a six correct operation is performed. It should be remembered that Borrow Out in this particular instance is the result of a one bit passed by OR circuit 218 to AND circuit 229. AND circuit 229 is conditioned by the Zone DEC signal on Conductor 45. However, it should also be noted that the one bit passed by OR circuit 218 is applied to AND circuits 274 and 276 and to inverter 285. The output of inverter 285 is applied to AND circuits 268, 272 and 277. Because the output of exclusive OR circuit 116 is a one bit, OR circuit 281 passes a one bit. The output of exclusive OR circuit 115 is a one bit and although AND circuit 276 is conditioned by the output of OR circuit 218, inverter 287 changes the one bit provided by exclusive OR circuit 115 into a zero bit. Further, the one bit of exclusive OR circuit 115 cannot pass AND circuit 277 because it is inhibited by the signal from inverter 285. The other AND circuit 278 receives a one bit from exclusive OR circuit 115 but it is not conditioned because it is inhibited by the absence of the $\overline{\text{DEC}}$ signal. Therefore, OR circuit 280 passes a zero bit. In a similar manner, it will be seen that OR circuits 270 and 275 also pass zero bits. The Zoned Decimal operation is now complete and the proper answer has been obtained.

It should be noted that the register 20 is shown as a shift register. Control 40 provides the signals for operating register 20 in a shift register mode. Shifting right and left is useful when performing multiplication and division respectively. Shifting can also be used for logical operations.

What is claimed is:

1. An arithmetic and logic unit for selectively performing arithmetic and logical operations upon a pair of operands represented in coded form comprising control means for selectively providing predetermined control signals;

complement means connected to receive one of said operands and responsive to control signals from said control means to pass said one operand in true form, one's complement form or nine's complement form;

first subtractor means operative to subtract said one operand passed by said complement means from the other of said operands;

borrow look ahead means connected to receive said one operand passed by said complement means, said other operand, control signals and results from said first subtractor means to develop in parallel low and high order groups of borrow signals; and second subtractor means connected to receive said results from said first subtractor means, a control signal and said plurality of borrow signals and operative to subtract said control signal and said borrow signals from said results of said first subtractor means.

2. The arithmetic and logic unit of claim 1 wherein said first subtractor means comprises a plurality of exclusive OR circuits.

3. The arithmetic and logic unit of claim 1 wherein said second subtractor means comprises a plurality of exclusive OR circuits.

4. The arithmetic and logic unit of claim 1 wherein one of said control signals received by said borrow look ahead means is a borrow in signal and other control signals of said control signals direct said borrow in signal to said low and high order groups of borrow signals.

5. The arithmetic and logic unit of claim 1 wherein another of said control signals received by said borrow look ahead means selectively generates a borrow out signal from said low and high order groups of borrow signals.

6. The arithmetic and logic unit of claim 5 wherein said another control signal is a zoned decimal control signal.

7. The arithmetic and logic unit of claim 4 wherein said borrow in signal is selectively directed to said high order group of borrow signals by a sign control signal.

8. The arithmetic and logic unit of claim 4 wherein said borrow in signal is constantly directed to said low order group of borrow signals.

9. The arithmetic and logic unit of claim 5 wherein the presence of said another control signal generates said borrow out signal from said low order group of borrow signals.

10. The arithmetic and logic unit of claim 5 wherein the absence of said another control signal generates said borrow out signal from said high order group of borrow signals.

11. The arithmetic and logic unit of claim 1 further comprising functional logic control means connected to receive said one operand passed by said complement means, said other operand, results from said first and second subtractor means and control signals from said control means whereby said function control means selectively passes the results of said second subtractor means or the results of logically Anding, Oring, or Exclusive Oring said one and other operands.

12. The arithmetic and logic unit of claim 1 further comprising six correct means connected to receive the results of said second subtractor means, borrow signals from said borrow look ahead means and control signals from said control means and selectively operative under control of said control signals and said borrow signals to six correct said results of said second subtractor means.

13. The arithmetic and logic unit of claim 12 wherein said six correct means selectively six corrects a low order group of results from said second subtractor means.

14. A arithmetic and logic unit of claim 12 wherein said six correct means selectively six corrects a high order group of results from said second subtractor means.

15. The arithmetic and logic unit of claim 12 wherein said six correct means further comprises logic responsive to certain of said control signals to generate a low order group of sign signals.

16. The arithmetic and logic unit of claim 12 wherein said six correct means further comprises logic responsive to certain of said control signals to generate a high order group of sign signals.

17. The arithmetic and logic unit of claim 12 wherein said six correct means further comprises logic responsive to certain of said control signals to generate a high order group of zone signals.

* * * * *